Nov. 28, 1933.     A. A. THAYER     1,936,695
SHOCK ABSORBER
Filed Jan. 31, 1929     2 Sheets-Sheet 1
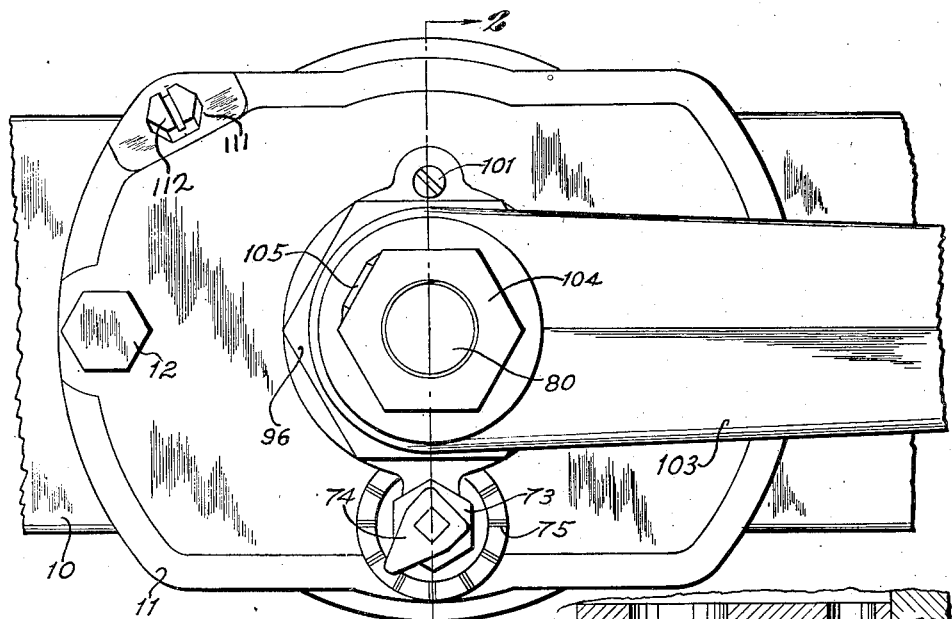
Fig-1
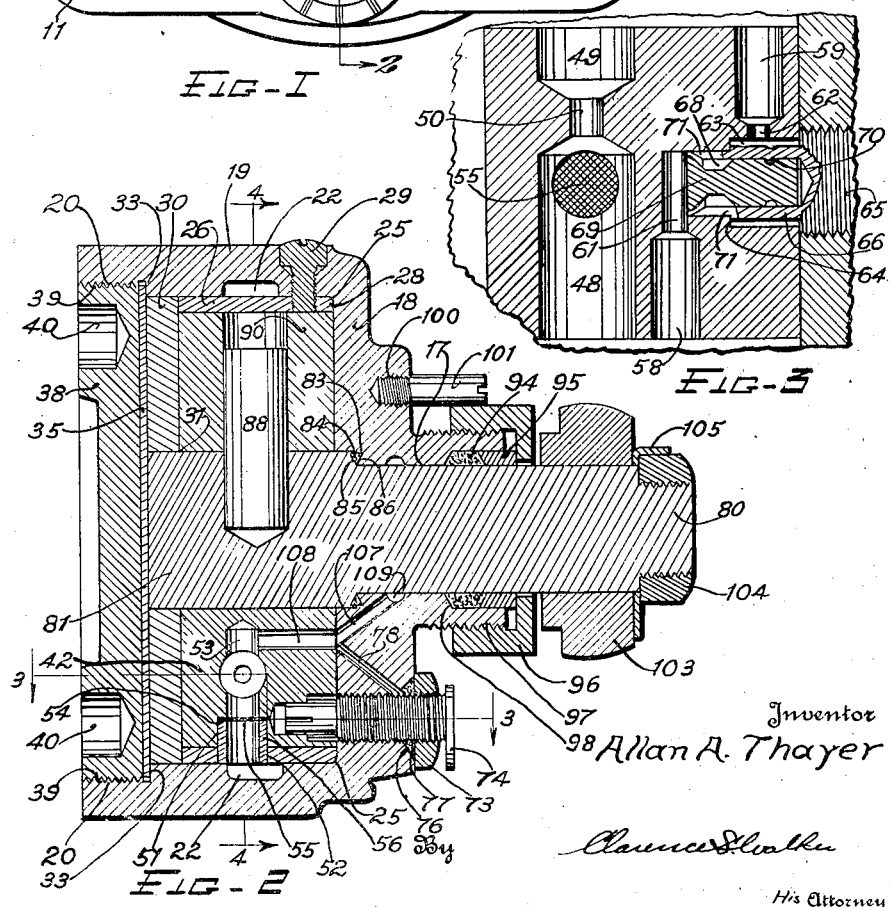
Fig-3
Fig-2
Inventor
Allan A. Thayer
Clarence S. Walker
His Attorney Nov. 28, 1933.  A. A. THAYER  1,936,695
SHOCK ABSORBER
Filed Jan. 31, 1929   2 Sheets-Sheet 2
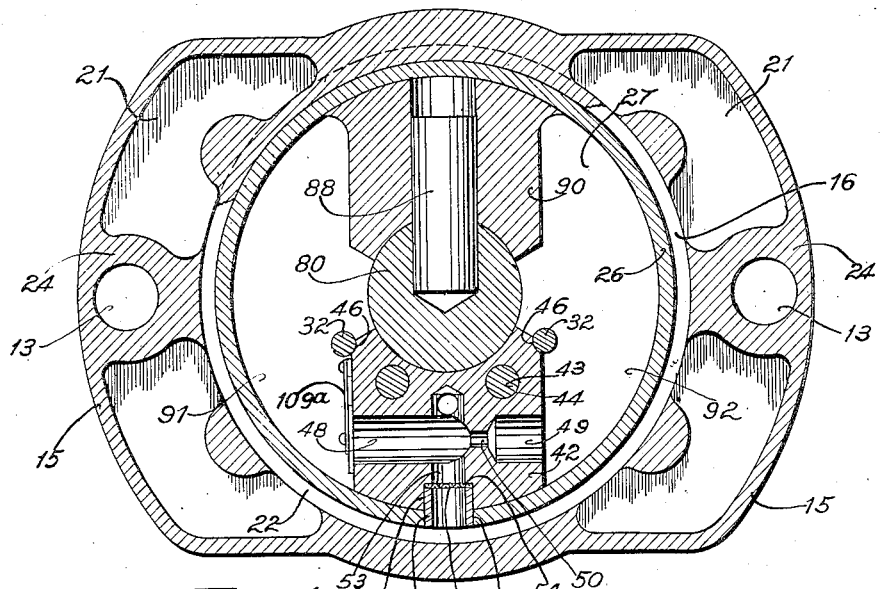
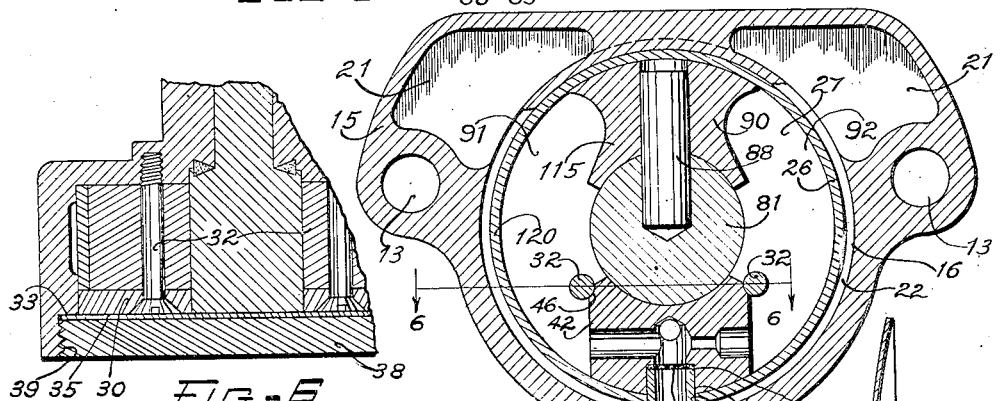
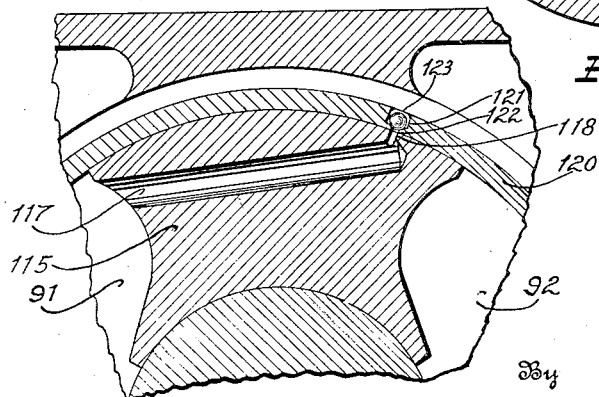
Inventor
Allan A. Thayer
By Clarence H. Walker
His Attorney Patented Nov. 28, 1933

1,936,695

UNITED STATES PATENT OFFICE 1,936,695

SHOCK ABSORBER

Allan A. Thayer, Jamestown, N. Y., assignor to Two-Way Shock Absorber Company, Jamestown, N. Y., a corporation of New York Application January 31, 1929. Serial No. 336,624

10 Claims. (Cl. 188—89)

This invention relates to an improvement in shock absorbers and more particularly to one of the hydraulic type wherein the shock is received and absorbed through a liquid medium as said liquid passes through certain restricted openings provided therefor.

The present invention has for the primary object to provide a shock absorber of the single wing type which is so constructed that it can be manufactured and assembled with a minimum of labor and expense and in which the drum is held against expansion under all conditions of use.

Another object of this invention resides in the provision of means by which to tie the outer drum ends of the fluid chamber together in such a way as to prevent expansion under pressure, the same means positively fastening a division block within said chamber.

Other objects and advantages of this invention reside in the details of construction and operation as pointed out in the following specification and in the drawings forming a part thereof, and in which;

Fig. 1 is a front elevation of a shock absorber embodying one form of this invention;

Fig. 2 is a vertical sectional view taken on the line 2—2 of Fig. 1;

Fig. 3 is a fragmentary sectional view taken on the line 3—3 of Fig. 2 indicating the connection between the pockets formed in the shock absorber chamber;

Fig. 4 is a vertical sectional view of the shock absorber taken on th line 4—4 of Fig. 2 and shows the wing and shaft in section and a portion of the casing broken away to disclose further details of construction;

Fig. 5 is a sectional view of a slight modification of the structure shown in Fig. 4;

Fig. 6 is a fragmentary sectional view taken on the line 6—6 of Fig. 5 and shows the manner of securing the inner cover of the shock absorber to the shell thereof;

Fig. 7 is an enlarged fragmentary sectional view of the wing shown in Fig. 5 and discloses a passage in said wing which communicates, during certain stages of the travel thereof, with a reservoir opening in which is placed a ball check valve; and Fig. 8 is a sectional view of the sealing disc shown in Fig. 2.

The shock absorber upon which this invention is based is an improvement on the shock absorber set forth in my pending application Serial No. 123,434, filed July 19th, 1926. In the drawings the reference numeral 10 indicates a portion of the frame of a motor vehicle to which the shock absorber 11 is attached in any desired manner as by the use of bolts 12 which pass through holes 13 provided therefore in the casing 15 of the shock absorber. The casing 15 is cupped, having a large cylindrical and centrally located compartment 16, open at one end of the casing, and a passageway 17 leading from the center of the compartment 16 to the other end of the casing. The base 18 and wall 19 of the compartment 16 are preferably finished by machining, the base 18 being finished in a plane at right angles to the center line of the compartment 16. The wall 19, being cylindrical with such center line as its axis, is provided with internal threads 20 located adjacent the mouth of the compartment 16. The casing 15, as shown particularly in Fig. 4, is somewhat oval in shape, and since the compartment 16 is centrally located, there are provided at each side spaces which function as a reservoir 21 by which the amount of fluid employed in the operation of the device is kept constant. The reservoir 21 extends completely around the compartment 16, the larger portions thereof being connected by a channel 22 formed in the wall 19, which wall completely encircles the compartment 16. In order to further strengthen the casing 15 integral posts 24 are formed at suitable intervals.

In machining the casing 15 it has been found practically impossible, without the use of very expensive tools and considerable time, to make the joinder between the base 18 and the wall 19 accurate so that in cross section these two parts will be at right angles to each other and also so that there will be no fillet 25 left at the joinder. Such a construction is absolutely necessary for the proper functioning of the shock absorber, and in order to avoid the necessity of such careful and time using work, a ring 26, having an outside diameter substantially that of the inside diameter of the wall 19, is forced into the compartment 16 and constitutes the wall of the compression chamber 27. The lower outer edge 28 of the ring 26 is cut away, as indicated in Fig. 2, in order to avoid any fillet 25 which may be left as a result of the machining operations upon the inner faces of the walls 18 and 19. By this means it is insured that the compression chamber 27 shall have a side wall which is at all points perpendicular to the wall 18. The ring 26 is held secure against rotation in the housing by means of a set screw 29 and is seated therein through the use of an inner cover plate 30 which rests upon the outer edge of the ring 26. Centrally of the plate 30 an opening 31 is produced, the purpose of which is to permit entrance of the head of the shaft. Screws 32 adjacent the operating shaft, are provided by which to secure the cover plate 30 in engagement with the outer edge of the ring 26. These screws also act to prevent rotation of the cover plate when the piston within the chamber is being oscillated. In as much as the screws 32 are for a two-fold purpose a more complete description thereof will be subsequently brought out in conjunction with other details of the invention.

It is to be noted that the wall 19 of the casing is provided with a shoulder 33 at right angles to said wall and upon which, when the device is assembled, a sealing disc 35 is located. The disc 35, as shown in Fig. 8 of the drawings, is arcuately curved, being used for a purpose about to be described. A cap 38, having exterior threads 39, engages the internal threads 20 of the wall 19 and when tightened, through the use of a spanner engaging the holes 40, presses against the disc 35 thus causing it to straighten out and engage the circumferential shoulder 33 of the wall 19. Attention is called to the fact that it is practically impossible to create an absolute seal through the use of a gasket of the usual type but that it has been found possible to create such a seal with a metal to metal engagement. The purpose therefore of the disc 35 is to create a metal to metal seal upon the open side of the casing thereby preventing a failure of the shock absorber, through loss of compression due to loss of fluid. It will be understood that when the shock absorber 11 is mounted upon the frame 10 of a motor vehicle, the cap 38 is adjacent the frame and cannot be tampered with. In other words, once the seal of the chamber 27 has been created by means of the disc 35 and cap 38, such seal is never broken as long as the shock absorber continues in use upon the motor vehicle.

Within the chamber 27 is mounted a division block 42 secured to the base 18 by pins or keys 43 which enter the openings 44. In as much as the successful operation of the shock absorber depends upon the immobility of the division block, the pins 43 are not entirely relied upon to secure said block in place but the screws 32, as mentioned above in conjunction with the cover plate 30, are adapted to engage the shoulders 46 of the division block to prevent movement thereof. In this manner the division block is made immobile, being secured to the base wall 18 by means of two pins and two screws. The outer face of the block 42 is arcuate and bears against the inner face of the ring or wall 26.

Into each side of the block 42 are drilled passageways 48 and 49 which are connected by a restricted passage or neck 50. From the passageway 48 an outlet 51 extends which leads to the outer wall of the block 42 and coincides with an aperture 52 formed in the ring 26, thus connecting the outlet 51 with the annular channel 22 in the casing 15. The aperture 52, in the block 42, is provided with a diametrically reduced neck 53 by which the shoulder 54 is created. A screen 55 is inserted in the outlet 51 and upon the shoulder 54. A tube 56 is likewise inserted in the outlet 51 and rests upon the screen 55. The tube 56 extends beyond the lower edge of the division block 42 and into the aperture 52 of the ring 26 thus creating a further tie between said ring and said division block. Again attention is called to the fact that the division block 42 is subjected to the full force of the fluid within the chamber when under pressure, due to oscillation of the piston, and it is therefore necessary that additional securing means be provided beyond that of the screws 32 and pins 43.

In addition to the passageways 48 and 49, the block 42 is also provided with a by-pass which comprises a passageway 58 parallel to the passageway 48 and a passageway 59 parallel to the passageway 49. The passageways 58 and 59 terminate in small neck extensions 61 and 62 respectively which are connected by a space or pocket 63 in the block. The pocket 63 at its juncture with the neck 61 is of a reduced diameter, being enlarged however from the shoulder 64 to the edge of the block. Through the base 18, of the casing 15, extends an adjusting screw 65, the inner end 66 of which enters the pocket 63. The tip 66 is provided with a hole 68 in which is located a pin 69, the walls of which are annularly recessed to provide for the passage of fluid from adjacent the center of the hole 68 out of the end thereof into the pocket 63. The pin 69, at its inner end, is provided with an annular groove which receives the indented portion 70 of the screw 65 thus preventing removal of said pin from the hole 68. A slot 71, opening into the hole 68, and of slightly greater length than the pocket 63 from the neck 61 to the shoulder 64, is produced in the tip 66 of the screw 65 in order to provide communication between the exterior of said tip and the hole 68. When the screw 65 is turned to occupy its innermost position the inner end of the slot 71 will be slightly above the shoulder 64 of the pocket 63 and therefore it is obvious that, while the lower and reduced end of the pocket 63 is completely filled by the tip 66 and the neck 62 is practically closed, a small amount of fluid may at all times enter the slot 71 passing into the hole 68, around the pin 69, and into the neck 61. In other words, the screw 65 cannot act as a complete stop to the travel of the fluid from one side of the division block to the other by way of passages 59 and 59. In this manner the fluid opening through the adjusting means cannot be entirely closed thereby preventing the building up of abnormal pressures within the device. Furthermore, the slot 71 provides a direct passage for the fluid whether the screw 65 is in closed or opened position and as a result the fluid will not block or seal in the passage even under severe winter conditions when it becomes thick. It is well known that in cold weather when fluid has not been agitated for some time it becomes sluggish and that upon being churned will shortly thin down to correct consistency. Therefore if the screw were not provided with the directly communicating slot 71 it would be necessary to open wide said screw to permit a flow of the fluid when starting to use this device and shortly thereafter close it again to prevent too rapid a flow of the thinned fluid. The screw 65 is secured in its desired position by means of a lock nut 73 and its location with relation to the neck 61 is indicated by a finger 74 which travels over a scale 75 formed on the outer face of the casing 15. To prevent the possible escape of fluid past the outer end of the screw, the casing wall is recessed at 76 to receive a washer 77 which surrounds said screw. A passage 78 connects the recess 76 with the interior of the device thus causing any fluid accumulating within said recess to be returned for use.

A shaft 80, having a slightly enlarged head 81, occupies the passageway 17 and chamber 27. The head 81 terminates within the opening 31 of the cover plate 30. The head 81 is preferably made somewhat longer than the distance between the base 18 and the outer face of the cover plate and, in order to be accommodated within the chamber 27, an annular depression 83 is formed in the casing 15, at the inner end of the passageway 17. Suitable packing 84 is inserted between the shoulder 85 of the head and the base 86 of the depression 83. It will be noted that the packing 84 is wedge shaped and, when the shaft head 81 is moved to engage the base 18, flows into the depression 83, thus producing a positive seal around the shaft 80 against fluid leakage. The outer end of the head 81 terminates flush with the outer edge of the cover plate 30 and, when the device is assembled, closely approaches the disc 35.

Mounted on the head 81 midway between the inner face of the cover plate 30 and base 18 and by means of a pin 88, which is at right angles to the shaft 80, is a wing or piston 90. The piston 90, as shown particularly in Fig. 4 of the drawings, is curved at its outer end to coincide with the curvature of the ring 26, and at its inner end to coincide with the outer surface of the head 81. Reference now being had to Fig. 4 of the drawings it will be noted that the division block 42 and the wing or piston 90, when mounted with relation to the head 81, divide the chamber 27 into two pockets or chambers 91 and 92. As will be brought out in further detail, the chamber 91 is the high compression chamber, while the chamber 92 is the low compression chamber. The terms high and low compression, here employed with reference to the function of the shock absorber, are well understood by those skilled in this art and no explanation thereof is believed to be necessary.

The shaft 80 is sealed against escape of fluid through the passage 17 from the chamber 27 by means of packing 94 and a packing gland 95 which encircles the shaft 80. The packing and gland are located within an enlarged portion of the opening 17. When the packing nut 96 is brought into engagement with the threads 97 of the base 18, the gland 95 compresses the packing 94 closely about the shaft 80, the shoulder 98 of the enlarged portion of the opening 17 providing a surface against which the packing is compressed. A drilled and tapped opening 100 extends into the base wall 18 from the exterior thereof and is adapted to receive a screw 101 which, because of its location, locks the packing nut in any desired position. On the outer end of the shaft 80 is keyed an arm 103 which is held upon the shaft by a nut 104 and lock washer 105. The arm 103 is connected in the usual manner, as for instance that shown in my earlier application, to the axle or other spring supporting member.

Attention is called to the fact that an opening 107 is provided in the base 18 directly beneath the division block 42 and in direct communication with the passageway 108 in said block. The passageway 108 in turn directly communicates with the reduced portion 53 of the aperture 52 which extends into the passageways 48 and 49. It has been applicant's experience that, when the shock absorber is in action, the pressure created upon the fluid by the oscillation of the piston causes a certain amount of fluid to pass the packing 84 and travel outwardly along the shaft 80. It is obvious that should this fluid be permitted to escape to the exterior of the shock absorber, after a time the efficiency thereof will be greatly impaired due to the reduced supply of fluid. In order to prevent this loss and the consequent imperfect functioning of the device, an annular groove 109 is provided in the walls of the passageway 17. This groove opens into the passageway 107 and, as the fluid works its way into the groove, it immediately flows downwardly around the shaft 80 into the passageway 107, into the passageway 108 in the divider block and thence into the chamber 27.

The reservoir 21 is filled with fluid through an opening 111 which is closed by a plug 112. As the fluid enters the reservoir 21, either by gravity or pressure, it passes through the channel 22, thence through the tube 56 and screen 57, the neck 50 and passageway 49 into the low compression chamber 92. From the chamber 92, the fluid passes into the passageway 59 of the division block past the screw 65 which has been backed off to permit free passage of the fluid and out of the passageway 58 into the high compression 91. During the filling operation the shaft 80 is oscillated to move the piston 90 to its limit in the high compression chamber 92. When the device is nearly filled the piston is moved back and forth thus causing the fluid to become equally distributed in both high and low compression chambers. The set screw 29 is removed during filling thereby allowing any air which may have entered with the fluid or which was contained within the chamber to pass out therefrom or to permit a more rapid filling by causing fluid to enter the chamber from this point.

The division block 42 is provided with a flapper valve 109ª which permits the free passage of fluid from the passageway 48 into the chamber 91 but prevent movement of the fluid in the opposite direction. When the chambers 91 and 92 have been entirely filled with fluid and the plug 112 and set screw 29 have been inserted, the shock absorber is mounted upon the frame of the motor vehicle and the arm 103 is connected to the axle or other spring supporting mechanism in any desired manner. Any tendency of the spring supporting mechanism to approach the frame actuates the arm 103 causing the shaft 80 to oscillate swinging the wing or piston 90 to the right as viewed in Fig. 4 of the drawings. This reduces the size of the low compression chamber 92 and increases the size of the high compression chamber 91. The fluid in the chamber 92, being placed under compression, escapes through the passage 49, neck 50 into the passage 48, then travels either through the outlet 53 into the reservoir 21 or past the flapper valve 109ª into the high compression chamber 91. Under normal conditions the movement of the piston 90 is quite free, the fluid escaping in front of it without retarding the movement of the piston to any great extent. When the wing 90 swings to the right, as above described, there will be a form of suction set up which will draw the fluid from the passageway 48 into the chamber 91 thus filling said chamber. The movement of the axle away from the frame will obviously cause the shaft 80 to oscillate in the opposite direction swinging the piston 90 to the left, thus compressing the fluid in the high compression chamber 91 and relieving the pressure upon the fluid in the chamber 92. This latter movement of the piston 90 is resisted by the fluid already within the chamber 91 because of the fact that it can only escape through the by-pass made up of passageways 58, 59, necks 61 and 62, and pocket 63. This outlet is very much more restricted than that through the passageways 48 and 49 and neck 50 not only because the diminished size of the passageways but because of the fact that the screw 65, under normal condition, partially closes the pocket 63 thus forcing the fluid to pass through the slot 71. Because of this fact the movement of the piston 90 to the left is much slower than is its movement to the right. The resistance of the fluid in the chamber 91 can be increased or diminished by the adjusting screw 65. Any fluid that might escape under pressure along the shaft 80 is returned to the reservoir 21 through the passageways 107, 108 and 53.

Referring now to Figs. 5, 6 and 7 of the drawings, a slight modification of the above disclosed structure is shown. In this modification the shock absorber is considerably diminished in size being for use upon automobiles of lighter weight. The reservoirs 21 are approximately one-half the size of the reservoirs 21 in the previously described modification but communication with the chamber 27 is had in exactly the same manner as by the channel 22 and division block 42. Since in this modification the shock absorber is of a reduced size, certain of the elements forming a part thereof are likewise reduced in size and particularly the division block. Because of the decrease in force of shock which this device must handle, the division block 42 is not provided with pins 43 by which to secure it to the base 18, but relies solely upon the screws 32 and tube 56.

The wing or piston 115, shown in Figs. 5 and 7 of the drawings, is provided with a passageway 117 which opens into the high compression chamber 91. The other end of the passageway 117 terminates in a small neck passageway 118 which opens upon the outer curved surface of the piston adjacent the ring 120, forming the peripheral walls of both high and low compression chambers. The ring 120, with the exception of the structure about to be described, is identical with the ring 26 shown and described in the previous modification. A radially extending opening 121 is cut into the ring 120 substantially three-fourths the thickness thereof. A small opening 122, approximating in size the neck 118, provides an opening from the exterior of the ring through the passageway 121 into the interior thereof. The jointure of the opening 122 with the passageway 121 is formed to provide a seat for a ball check 123 which is held within the passageway 121 by peening over the edge thereof.

It is well known that fluid when agitated becomes foamy and full of air bubbles upon its surface. It is further well known that any fluid containing an appreciable amount of foamy or bubbly mixture will not function properly within a hydraulic shock absorber. Applicant has therefore provided means by which the surface fluid containing air bubbles may be removed and supplanted with fluid containing no such air bubbles. This is accomplished through the use of the structure just described and in the following manner. When the piston 115 is moved from the low to the high compression chamber, the surface fluid within the high compression chamber will flow into the passageway 117. The fluid cannot escape through the neck 118 in as much as said neck is against the machined wall of the ring 120. However, when the neck 118, in moving along the wall of the ring 120, approaches the opening 112, the pressure of the fluid within said neck will cause the ball check 123 to move upwardly from its seat and permit a small amount of the bubbly fluid to pass into the channel 22. In as much as the reservoir 21 is located adjacent the top of the shock absorber, as a small amount of fluid passes out of the upper part of the channel 22 an equal amount of fluid will pass from the lower part of the channel 22 up into the chamber 92 thus retaining a uniform amount of fluid within the chambers 91 and 92 to facilitate proper functioning of the device. Attention is called to the fact that but very little of the foamy fluid passes the check valve upon each rotation of the piston but in as much as the piston is oscillated under normal circumstances many times a minute, it may be readily understood that the foamy liquid is easily removed by this means.

Although applicant has shown a method of removing the foamy fluid from within the compression chamber in but one modification, it is obvious that this structure is readily adaptable for use in conjunction with the modification first described and, furthermore, although but two modifications of this invention have been shown and described, applicant does not intend to be limited thereto in as much as other modifications or adaptations may be made without departing from the spirit and scope of this invention as set forth in the hereonto annexed claims.

Having thus set forth my invention what I claim is new and for which I desire protection by Letters Patent is:—

1. A shock absorber comprising a casing and a compression chamber within said casing, the base of said chamber being formed by said casing, a cover plate parallel to and spaced from said base, and a ring mounted between said base and said plate, said ring forming the circumferential walls of said chamber, a sealing disc engaging said plate and a cap engaging said disc, said cap and said disc being adapted to move said plate against said ring, whereby to make said chamber fluid tight.

2. A shock absorber comprising a casing and a compression chamber within said casing, the base of said chamber being formed by said casing, a cover plate parallel to and spaced from said base, a ring mounted between said base and said plate, said ring forming the circumferential walls of said chamber, a disc sealing the open side of said casing, a threaded cap engaging said casing and causing said disc to force said plate against said ring, and said ring against said base thus making said chamber fluid tight.

3. In a shock absorber comprising a casing and a fluid containing compression chamber in said casing, a piston in said chamber, a shaft adapted to support and oscillate said piston thereby compressing the fluid in said chamber and means mounted in one wall of said chamber, said means being adjacent said shaft and secured to the opposite wall of said chamber to prevent the expansion of any portion of said compression chamber during operation of the device.

4. A shock absorber comprising a casing, a compression chamber within said casing, a ring within and forming the circumferential walls of said chamber, the base of said casing forming one wall of said chamber, a cover plate parallel to and spaced from said base by said ring, a disc sealing the open side of said casing, a cap causing said disc to closely engage the walls of the open side of said casing whereby to create a metal to metal seal.

5. In a shock absorber, a casing having a compression chamber therewithin, a ring mounted in said casing forming the circumferential walls of said chamber, the base of said casing and a cover plate forming the vertical walls of said chamber, a piston within said chamber, a shaft supporting and adapted to oscillate said piston thereby compressing the fluid within said chamber and means tying said vertical walls together, said means projecting through said compression chamber.

6. In a shock absorber comprising a casing and a fluid containing compression chamber in said casing, a piston in said chamber, a shaft supporting and adapted to oscillate said piston thereby compressing the fluid in said chamber, means forming with said piston two variable size chambers within said compression chamber and a further means securing said first means against any movement relative to said piston, said last means being located adjacent said shaft and preventing the expansion of the vertical walls of said compression chamber when said shock absorber is in use.

7. In a shock absorber comprising a casing and a fluid containing compression chamber in said casing, a piston in said chamber, a shaft supporting and adapted to oscillate said piston thereby compressing the fluid in said chamber and means forming a part of said piston and said peripheral wall of said compression chamber for removing fluid mixed with air or gases from within said compression chamber when said shock absorber is in use.

8. In a shock absorber comprising a casing and a fluid containing compression chamber in said casing, a piston in said chamber, a shaft supporting and adapted to oscillate said piston thereby compressing the fluid in said chamber and means forming a part of said piston and peripheral wall for removing fluid mixed with air or gases from within said compression chamber, said means comprising a passageway within said piston, a passageway through a ring forming the circumferential walls of said chamber, said piston passageway being in communication with said ring passageway at certain times during the operation of said shock absorber.

9. A shock absorber comprising a casing and a fluid compression chamber within said casing, the base of said chamber being formed by said casing, a cover plate parallel to said base and a ring between said base and said plate, said ring forming the circumferential walls of said chamber, a sealing disc engaging said plate, a cap engaging said disc, said cap compressing said disc and creating a metal to metal seal upon the open side of said casing, a piston in said chamber, a shaft supporting and adapted to oscillate said piston thereby compressing the fluid in said chamber, means in said chamber forming with said piston two variable size chambers and a further means securing said first means against any movement thereof relative to said piston, said further means also preventing the expansion of the vertical walls of said compression chamber when said shock absorber is in use.

10. In a shock absorber including a casing, a fluid containing compression chamber in said casing, a ring mounted in and forming the circumferential walls of said chamber, a piston in said chamber, a divider block forming with said piston two chambers within said compression chamber and fluid transmitting means adapted to secure said ring to said block.

ALLAN A. THAYER.